Patented Dec. 18, 1951

2,579,431

UNITED STATES PATENT OFFICE 2,579,431

PARASITICIDE COMPOSITION

Oscar H. Hammer, South Haven, Mich., assignor to The Dow Chemical Company, Midland, Mich., a corporation of Delaware No Drawing. Application March 9, 1950,
Serial No. 148,739

2 Claims. (Cl. 167—15)

The problem of mite damage to fruit trees and ornamentals has been aggravated in recent years by the increased popularity of the so-called DDT type parasiticides. These materials are very effective against many common orchard pests but singularly specific in their failure to control mites. DDT and closely related toxicants appear to kill the predatory and parasitic enemies of mites which normally aid in keeping mite infestations within reasonable bounds. With this upset in biological balance, mites have become a major problem in many areas where heretofore they have been of small importance.

For many years acid arsenate of lead has been widely and successfully employed as a parasiticide toxicant for the control of such insect pests as codling moth, curculio, green fruit worm, bud moth, leaf roller, and case-bearer organisms. In such use, its action has been established as being relatively specific with little or no control of the predatory and parasitic enemies of mites as well as mites themselves. Due to the lack of toxicity of this material for mite organisms and the generally favored increase in present mite populations, the need for a lead arsenate mixture which will control this organism is evident.

It has now been discovered that the 4-chlorophenyl ester of 4-chlorobenzene sulfonic acid may be combined with acid lead arsenate to obtain a parasiticide composition having very desirable properties for the control of plant parasites. In such mixture there appears to be no chemical reaction between the toxic constituents, and the toxicants are mutually activating so that a greater than additive effect is accomplished, particularly as regards mite and spider mite control. A further advantage resides in the prolonged residual effect exerted by the mixture. Thus, a single application of the mixture, compounded with a suitable liquid carrier in a spray composition, gives excellent control of such organisms as *Paratetranychus pilosus* (European red mite), *Tetranychus bimaculatus* (two-spotted spider mite), and *Bryobia praetiosa* for periods ranging up to several months. Also sprays comprising the combination of toxicants in the amounts required to accomplish the desired control do not appear to cause injury to either leaves or fruit.

In operating in accordance with the present invention, the new toxicant mixtures may be employed with any suitable liquid carrier in the form of spray compositions. Also a mixture of the toxicants may be so compounded as to produce concentrates adapted subsequently to be diluted to form spray or dust mixtures.

In the preparation of sprays, the 4'-chlorophenyl 4-chlorobenzene sulfonate and acid lead arsenate may be mixed together and the resulting mixture dispersed in water or other liquid carrier. Alternatively, the toxicants may be separately dispersed in the water or other carrier. Another mode of operation comprises mixing the toxicants with bentonite, diatomaceous earth, pyrophyllite or talc, and dispersing the resulting mixture in water. Any compatible wetting or dispersing agent may be employed in the spray composition.

Where a concentrate is desired, the mixture of toxicants may be compounded with dispersing and wetting agents. Alternatively, the toxicants may be separately compounded in concentrate form and mixed together upon dilution in the ultimate spray composition. In another mode of operation, the mixture of toxicants may be dispersed in a finely divided solid carrier to produce a concentrate adapted subsequently to be diluted with additional carrier to form dusts.

Wetting and dispersing agents adapted to be employed in the various compositions as suggested above include sodium lauryl sulfate, alkyl aryl sulfonate (Nekol A), phthalic glycerol alkyl resin (Triton B–1956), compounded substituted benzoic alkyl sulfonates (Daxad No. 27), dioctyl sodium sulfosuccinate (Aerosol OT), and polyoxyethylene derivative of sorbitan trioleate (Tween 85). Other conventional additaments may be employed provided only that such agent accomplish the end desired and not react with the other ingredients of the composition so as to reduce their effectiveness.

In the preferred method of operation, from about 1 to 12 parts by weight of acid lead arsenate is employed with each 4 parts of the 4-chlorophenyl ester of 4-chlorobenzene sulfonic acid. In such parasiticidal compositions the toxicants are mutually activating and exert a synergistic effect. In spray compositions, the proportions of the toxicants and dosages applied should be so integrated that the content of 4'-chlorophenyl 4- chlorobenzene sulfonate is at least 0.2 pound and the content of the acid lead arsenate is at least 0.5 pound per 100 gallons of spray. In concentrates, the mixture of toxicants may constitute from about 10 to 90 per cent by weight of the composition. Good results are obtained with dust compositions containing from 1 to 10 per cent by weight of the toxicant mixture.

It is to be understood that in compositions comprising mixtures of these two toxicants, either component may be present in the composition in excess of the proportion for which the combination of the toxicants is mutually activating. Such a composition constitutes a combination of the synergistic mixture with additional parasiticidal toxicant, and this practice in no way detracts from the improved result obtainable with the preferred proportions of the materials.

The 4-chlorophenyl ester of 4-chlorobenzene sulfonic acid is a white, crystalline solid, melting at 81°–83° C., and having the formula:

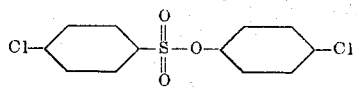

The following examples illustrate the invention but are not to be construed as limiting the same:

Example 1

40 parts by weight of 4'-chlorophenyl 4-chlorobenzene sulfonate was mixed and ground with 56.5 parts of fuller's earth, 2 parts of Daxad No. 27, and 1.5 parts of an alkyl aryl sulfonate (Nacconol NR) to form a wettable powder identified as "Concentrate A."

Concentrate A and a commercial lead arsenate concentrate, hereinafter referred to as "Concentrate B," were dispersed in water to produce a spray composition. The commercial lead arsenate concentrate was a wettable powder consisting of 96 parts by weight of finely divided acid lead arsenate and 4 parts of wetting and dispersing agents, and inerts. Concentrate A and Concentrate B were employed in the amount of 2½ pounds and 3 pounds, respectively, per 100 gallons of spray mixture.

The above spray composition was applied as a first cover spray to apple trees of the Red Delicious variety. The trees were heavily infested with eggs of both the two-spotted spider mite and European red mite, and located immediately adjacent to unsprayed check plots which provided a continuous source of reinfestation. The application was accomplished with conventional spray rig and in such dosage as to provide appreciable run-off from all tree surfaces. 34 days later, the foliage of the trees was subjected to randomized sampling, and the individual leaves examined to determine the existent mite population. An average population of zero mites per 50 leaves was observed. Control of codling moth and of redbanded leaf roller was also obtained in the plots treated with the spray mixture.

In a further operation, Concentrate B was dispersed in water to prepare a spray composition containing 3 pounds of the concentrate per 100 gallons of spray. Applications of the composition as first and second cover sprays were made to apple trees of the Red Delicious variety. These applications deposited upon the leaf and woody surfaces of the trees an amount of Concentrate B even greater than would have been deposited by a single application of a spray containing 6 pounds per 100 gallons. Randomized sampling and examination of the sprayed leaves 34 days following the initial application indicated an average mite population of 1880 mites per 50 leaves.

Similarly, Concentrate A was dispersed in water to prepare a spray composition containing 2.5 pounds of the concentrate per 100 gallons of spray mixture. This composition was applied as first and second cover sprays and in the above-described manner, so that the trees were contacted with an amount of Concentrate A equivalent to 5 pounds per 100 gallons. 34 days following application, the foliage of these trees was found to have an average infestation of 100 mites per 50 leaves.

No foliage injury resulted from the application of the mixture of toxicants. The trees treated therewith remained lush and green throughout the entire growing season, and were not subject to the leaf and fruit drop from mite attack which characterized the trees in the check plots. By the time of the occurrence of the first frost, a forty per cent defoliation of the check trees had taken place. A commercial crop of fruit was harvested from the treated trees, and was characterized by a better size, color, and flavor than the fruit produced by the check plots.

Example 2

A parasiticide composition was prepared in the form of a wettable powder by grinding 50 parts by weight of 4'-chlorophenyl 4'-chlorobenzene sulfonate, 1 part of an alkyl aryl sulfonate (Nacconol NR), 2 parts of Daxad No. 27, and 47 parts of fuller's earth. This product is hereinafter referred to as "Concentrate C."

Concentrate B of Example 1 and Concentrate C, both alone and in combination, were dispersed in water to prepare aqueous spray compositions. These compositions were employed for the control of Southern army worm on mature cranberry bean plants. In such operations, the bean foliage was wet with the indicated composition, the composition residue allowed to dry, and the plants then infested with a known number of insect larvae. 144 hours following infestation, the bean plants were examined to ascertain the degree of control of Southern army worm. The following table sets forth the amounts of materials employed and the percentage kills of Southern army worm obtained in the above operations:

| Amount of Composition per 100 Gallons of Spray | | Percentage Kill of Southern Army Worm |
|---|---|---|
| Composition C | Composition B | |
| .4 | 0 | 5 |
| 0 | 0.52 | 10 |
| .4 | 0.52 | 55 |

The present application is a continuation-in-part of my copending application Serial No. 108,651, filed August 4, 1949, now abandoned.

I claim:

1. A composition for the control of mite and insect pests, comprising as active toxic ingredients from 1 to 12 parts by weight of acid lead arsenate for each 4 parts of the 4-chlorophenyl ester of 4-chlorobenzene sulfonic acid, the active toxic ingredients in such composition being mutually activating.

2. A composition for the control of mite and insect pests, comprising an inert liquid carrier and dispersed therein as active toxic ingredients from 1 to 12 parts by weight of acid lead arsenate for each 4 parts of the 4-chlorophenyl ester of 4-chlorobenzene sulfonic acid, the active toxic ingredients in such composition being mutually activating.

OSCAR H. HAMMER.

REFERENCES CITED

The following references are of record in the file of this patent:

UNITED STATES PATENTS

| Number | Name | Date |
|---|---|---|
| 2,148,928 | Meuron | Feb. 28, 1939 |
| 2,358,942 | Siegler | Sept. 26, 1944 |

OTHER REFERENCES

Lauger et al., Helv. Chim. Acta, vol. 27, pages 892–908, particularly pages 901, 902, June 15, 1944, 167/22.

Metcalf, "Acaricidal Properties of Organic Compounds Related to D. D. T.," J. Econ. Ent., vol. 41, No. 6, December 1948, pages 875 to 882, 167/DDT.